Aug. 5, 1958     H. G. BOYLE ET AL     2,846,630

TRANSISTORIZED SERVO POSITIONER SYSTEM

Filed June 19, 1957     2 Sheets-Sheet 2

INVENTORS.
HOMER G. BOYLE.
RICHARD W. BRADMILLER.
CHARLES J. PARKER.
ALLEN E. PLOGSTEDT.
BY
ATTORNEYS.

2,846,630

TRANSISTORIZED SERVO POSITIONER SYSTEM

Homer G. Boyle, Dayton, and Richard W. Bradmiller, Charles J. Parker, and Allen E. Plogstedt, Cincinnati, Ohio, assignors to Avco Manufacturing Corporation, Cincinnati, Ohio, a corporation of Delaware Application June 19, 1957, Serial No. 666,527

14 Claims. (Cl. 318—28)

This invention relates to a transistorized servo positioner and, more particularly, to a transistorized control system for controlling a low torque shaft with high accuracy from a remote position.

In recent years there has been an ever-increasing need for a remote control system which is capable of very accurately positioning a low torque shaft such as that required for telemetering, fire control and automation equipments. The conventional prior art method for positioning a low torque shaft from a remote location is basically a tow-speed servo incorporating coarse and fine synchros with an accompanying power amplifier, damping network and drive motor. This prior art method is highly refined and widely used; however, present emphasis on miniaturization and limitations imposed by space factors, particularly in aircraft and missiles, sometimes leaves no room for even the smallest synchro or resolver. Moreover, presently used servo systems are not sufficiently accurate to meet the requirements of some of the more specialized systems.

It is an object of this invention to provide a transistorized servo positioner system which will be easily miniaturized and which will have very high accuracy.

Another object of this invention is to provide a transistorized servo positioner system which will be insensitive to power supply variations or mechanical stresses.

Still another object of this invention is to provide a servo positioner system which is not sensitive to A. C. noise of the short-term transient type and in which the effects of remote coupling to the pickup unit is readily cancelled.

Still another object of this invention is to provide a servo positioner system incorporating apparatus which will eliminate or greatly reduce overshoot and hunting.

Another object of this invention is to provide a servo positioner system which will produce a reference voltage in linear decade steps.

For a more complete understanding of the objects and advantages of this invention, reference should now be made to the following detailed description and to the accompanying drawings, in which.

Briefly described, the improved system includes a small reversible D. C. motor for accurately positioning a shaft, an electronic switching system for controlling the energization of the reversible D. C. motor, and a differential amplifier system for controlling the operation of the electronic switches. The differential amplifier system comprises a reference network and an error network, each comprising two stages of amplification connected across a single source of supply. The differential outputs of the networks are used to control the output of a driver-amplifier which, in turn, selectively controls the operation of the two electronic switches to control the energization of the reversible D. C. motor. Preferably, the electronic switches comprise a PNP-type transistor and an NPN-type transistor having interconnected emitters, and each having a base connected to a common point in the differential amplifier network. When the conductivity of the driver-amplifier is increased by the differential output, one of the transistor switches becomes conductive and the motor is energized in one direction. When the conductivity of the driver-amplifier is decreased, the other transistor switch becomes conductive and the motor is energized in the other direction. In either case, the motor will always drive an element in the error network until such time as the reference and error networks are balanced, and then the motor is again de-energized.

Figure 1:
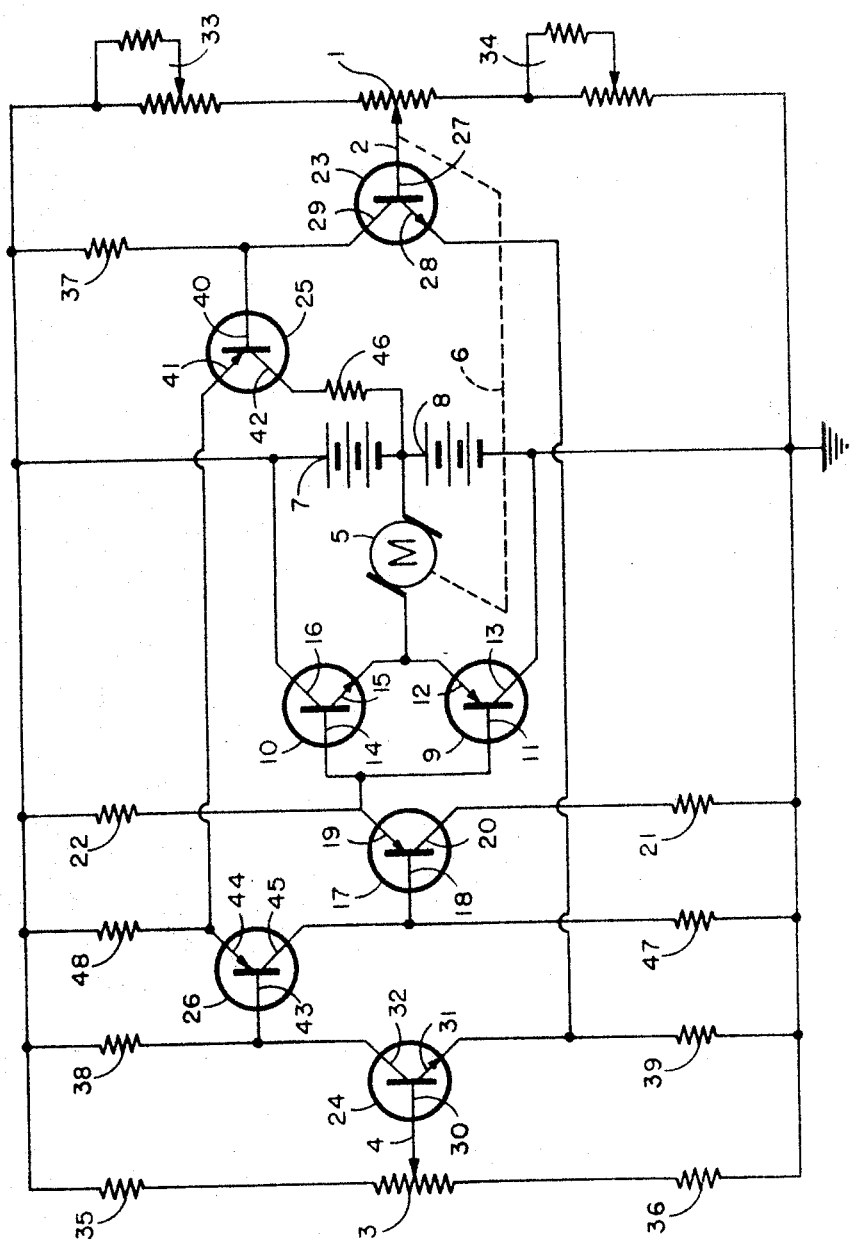
Fig. 1 is a schematic diagram representing a preferred form of the invention.

The servo positioner system illustrated in Fig. 1 includes an error potentiometer 1 having a movable tap 2 and a reference potentiometer 3 having a movable tap 4. The movable tap 2 of the error potentiometer is mechanically coupled to a small reversible direct current motor 5 by means of a shaft 6. The system is so designed that when the taps 2 and 4 are in the same relative positions, the windings of the motor 5 are de-energized and the shaft 6 and the movable tap 2 are maintained stationary. On the other hand, when the relative position of the movable taps 2 and 4 are altered, the system is so designed that the windings of the motor 5 will be energized by current flow in a direction which will again balance the system and de-energize the motor.

The energization circuit for the motor includes first and second supply batteries 7 and 8, or any other suitable source of operating potential. One side of the motor is connected to the junction of the supply batteries while the other side is connected between two electronic switches in the form of transistors 9 and 10. Transistor 9 is a PNP junction-type transistor having a base 11, an emitter 12 and a collector 13. Transistor 10 is an NPN junction-type transistor having a base 14, an emitter 15 and a collector 16. The emitter-collector diode of each transistor 9 and 10 provides a separate path from the supply batteries through the windings of the motor 5, and if the transistors 9 and 10 are both biased to cut-off, no current flows through the motor in either direction. However, if the transistor 9 is biased into conduction, a power circuit will be completed from the supply battery 8 through the motor 5 and the emitter-collector diode of transistor 9. If the transistor 10 is biased into conduction, then a power circuit will be completed from the supply battery 7 through the collector-emitter diode of transistor 10 and the motor 5. Since the flow of current through the motor 5 when the transistor 9 is conducting is in a direction opposite to that when the transistor 10 is conducting, the tap 3 will be raised or lowered, depending on which of the transistors 9 or 10 is conducting.

As is known in the art, transistors are current-operated devices and, to make a transistor conductive, forward biasing potential must be applied between the emitter and the base of the transistor. This means that with a PNP-type transistor, the emitter must be positive with respect to the base, while with an NPN-type transistor the emitter must be negative with respect to the base. In the illustrated arrangement, the emitters 12 and 15 are interconnected and, thus, are at the same potential; also, the bases 11 and 14 are interconnected and directly coupled to the output circuit of a driver amplifier 17 which is provided to establish a reference potential. The amplifier 17 comprises a PNP junction-type transistor having a base 18, an emitter 19 and a collector 20. In order that the transistors 9 and 10 be non-conductive at the same time, the bases of both transistors must be at approximately the same potential as the emitters, i. e., the base-emitter bias of each transistor must be zero. When no current is flowing through the motor 5, the potential at the emitters 12 and 15 is equal to the voltage of the battery 8. The system is designed so that at balance, the reference potential at the emitter output of the driver amplifier 17 (and thus at bases 11 and 14) is equal to the potential across the battery 8. Thus, at balance, the base-emitter bias of both transistors 9 and 10 is zero, and both transistors are non-conductive.

The collector 20 of transistor 17 is connected to the negative side of the supply batteries 7 and 8 through a load resistor 21, while the emitter 19 is connected to the positive side through an emitter resistor 22. The base 18 is connected to the output of a differential amplifier. If the forward biasing potential between the base 18 and the emitter 19 is increased as a result of a change in output of the differential amplifier, the driver 17 becomes more conductive, and the reduction in reference potential at the collector 20 will provide a forward bias for the transistor 9, and that transistor will become conductive. On the other hand, if the conductivity of the transistor 17 is decreased, the increase in reference potential at the collector 20 will bias the transistor 10 into conduction.

Control of transistor 17 is achieved by means of the differential amplifier system comprising the transistors 23, 24, 25 and 26. Transistor 23 is an NPN junction-type transistor having a base 27, an emitter 28 and a collector 29. Biasing potential at the base 27 is supplied from the tap 2 of potentiometer 1. The transistor 24 is an identical transistor having a base 30, an emitter 31 and a collector 32. Biasing potential for the base 30 is supplied from the tap 4 of potentiometer 3. The resistors 33, 34, 35 and 36 are provided for initially adjusting the system. The collector 29 of transistor 23 is connected to the supply batteries 7 and 8 through a load resistor 37, while the collector 32 of transistor 24 is connected to the supply batteries through a load resistor 38. The emitters 28 and 31 are both connected to ground through a common emitter-resistor 39.

The transistor 25 is a PNP junction-type transistor having a base 40, an emitter 41 and a collector 42. The transistor 26 is an identical transistor having a base 43, an emitter 44 and a collector 45. The collector 42 of transistor 25 is connected to the negative side of supply battery 7 through a load resistor 46, while the collector 45 of transistor 26 is connected to the negative side of supply battery 8 through a load resistor 47. The emitters 41 and 44 of the transistors 25 and 26 are both connected to the positive side of supply battery 7 through a common emitter-resistor 48.

As previously noted, the system is balanced when the potential at the emitter 19 of transistor 17 is equal to the potential at emitters 15 and 12, and this condition occurs when the input currents to each side of the differential amplifier from the taps 2 and 4 are equal. However, if the tap 4 is moved up, the forward biasing potential of the NPN-type transistor 24 is increased, thereby making transistor 24 more conductive and producing a decrease in voltage at the base 43 of the PNP-type transistor 26. This will cause an increase in the forward biasing potential and make the transistor 26 more conductive, thereby producing a voltage rise at the base 18 of the driver transistor 17. This will be reflected as an amplified rise at the emitter 19, causing conduction of the transistor 10. The motor 5 will then drive the tap 2 up to increase the potential at the base 27 and, thus, produce a potential drop at the collector 29 and the base 40 to render the transistor 25 more conductive. The motor will continue to run until the conductivity of transistor 25 again equals the conductivity of the transistor 26, and the potential at the base 18 of driver amplifier 17 is returned to its original value. At that time, both transistors 9 and 10 will be biased to cutoff, and the motor 5 will stop. Similarly, if the tap 4 is moved down, the transistor 9 will be rendered conductive to energize the motor 5 to drive the tap 2 down until the differential amplifier is again re-balanced.

Figure 3:
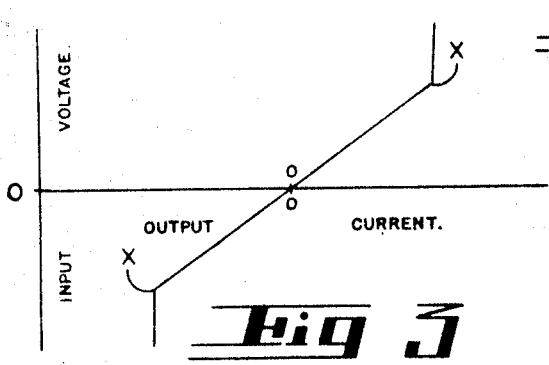
Fig. 3 is a curve illustrating the anti-hunt characteristics of the system.

The arrangement of the transistors 9 and 10 is such that overshoot and hunting are reduced to a minimum. This will best be understood by an examination of Fig. 1 in conjunction with the curve in Fig. 3 to which reference is now made. When the transistor 9 is conducting, the motor 5 is connected in circuit with the battery 8 and the emitter-collector diode of transistor 9. When the transistor 10 is conducting, the motor 5 is connected in circuit with the battery 7 and the emitter-collector diode of transistor 10. When, as indicated in Fig. 3, the system is balanced and the input voltage, i. e., the base-emitter bias of transistors 9 and 10, is zero, the output current of each transistor is zero and the motor 5 does not run. If, due to displacement of the potentiometer 3, the bias becomes positive or negative, the resultant forward or reverse output current through the motor increases very rapidly until saturation at the points X. Further increase in base-emitter bias does not affect motor operation. However, when the error potentiometer 1 is driven towards balance, and as the base-emitter bias is reduced to the value at the points X, the output current of the conducting transistor decreases rapidly with reduction in forward bias, thereby reducing motor energization until the motor stops in the balanced position. This is the equivalent of inserting a resistor which is rapidly increasing in size in series with the motor just prior to reaching the balanced position and, thus, the tendency for the motor to overshoot and hunt is eliminated.

Another advantage of this invention is in the arrangement of the common emitter-resistors 39 and 48 in the first two stages of the differential amplifier. Since these resistors and the entire reference and error networks are connected to a common power supply, variations of supply potential do not produce differential currents at any point. Therefore, a regulated power supply is not required for stabilized operation of the motor circuits. Moreover, because of this arrangement, the system is insensitive to temperature variations.

In a practical embodiment of the invention, the following circuit parameters were employed; however, it is to be understood that these parameters are merely illustrative of one practical embodiment of the invention, and it is not intended that the invention be limited thereby:

| | |
|---|---|
| Potentiometer 1 | 1 K ohms (10 turns). |
| Potentiometer 3 | 1 K ohms (10 turns). |
| Resistor 21 | 220 ohms. |
| Resistor 22 | 1 K ohms. |
| Resistor 33 | 820 ohms (variable). |
| Resistor 34 | 820 ohms (variable). |
| Resistor 35 | 500 ohms. |
| Resistor 36 | 600 ohms. |
| Resistor 37 | 2.2 ohms. |
| Resistor 38 | 2.2 ohms. |
| Resistor 39 | 2.2 ohms. |
| Resistor 46 | 820 ohms. |
| Resistor 47 | 3.9 K ohms. |
| Resistor 48 | 900 ohms. |
| Battery 7 | 22½ volts. |
| Battery 8 | 22½ volts. |
| Transistor 9 | Type 2N95. |
| Transistor 10 | Type 2N68. |
| Transistor 17 | Type 2N158. |
| Transistor 23 | Type 2N35. |
| Transistor 24 | Type 2N35. |
| Transistor 25 | Type 2N181. |
| Transistor 26 | Type 2N181. |

In the practical embodiment, each of the transistors in the differential amplifier was a high current gain transistor. It was found that a difference of 2 microamperes between the base currents of the transistors 23 and 24 produced a current flow of 125 milliamperes through the windings of the motor 5, and the response of the system was very fast. It was also found that the system was linear and had excellent fidelity. This improved servo apparatus may be used equally well as a readout or as a servo positioner; that is, the movement of the potentiometer tap 2 may give readout or indications of the position of the potentiometer tap 4, or the tap 4 may be used to control the position of the shaft 6. The system is equally well adapted for use with a small motor, such as would be used for readout purposes, or with a very large motor for positioning purposes.

Figure 2:
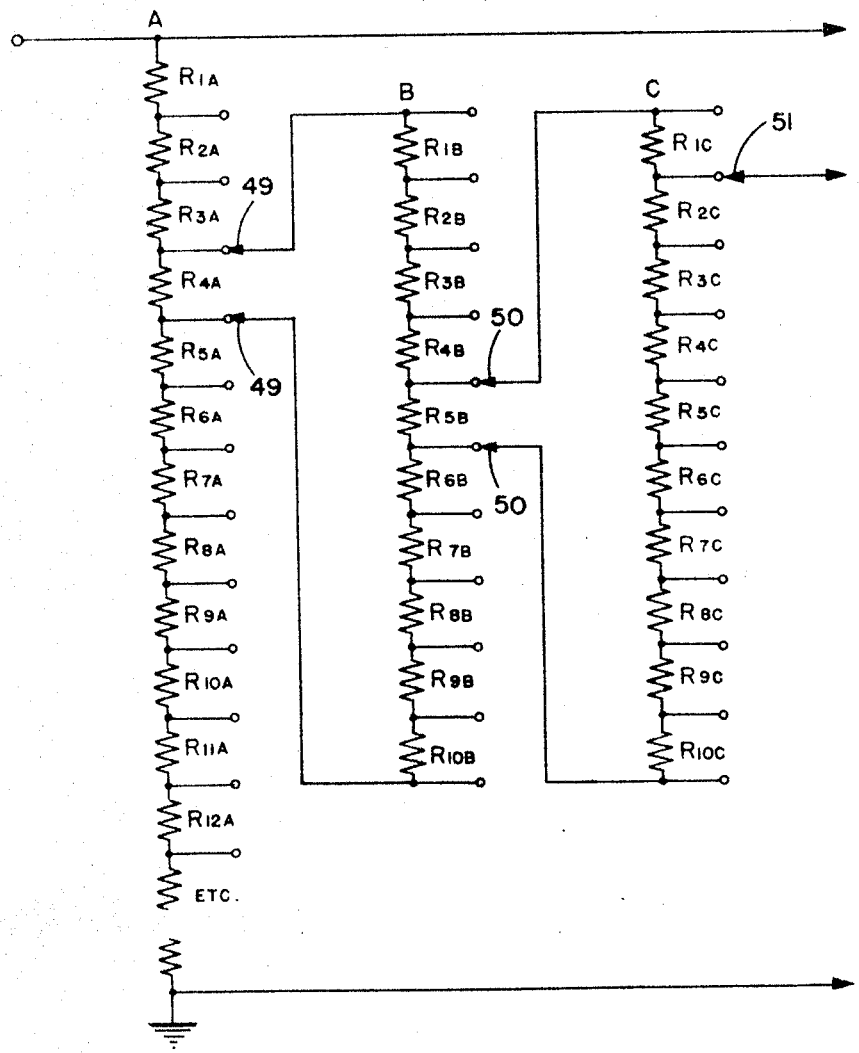
Fig. 2 is a modification of the invention in which a reference voltage is obtained in decade steps.

In many applications of the servo system illustrated in Fig. 1, it is desirable to obtain reference voltages in decade steps. Some applications where this would be desirable are in tuning mechanisms, remote control operations, and as a reference voltage for counters. Fig. 2 illustrates an improved arrangement for obtaining such voltages. The decade reference network illustrated contains three branches, A, B and C. It is to be understood, however, that any number of branches may be used, depending upon the accuracy requirements of the system.

The first branch A may contain any desired number of steps, each of which is represented by a resistor $R_{1A}$, $R_{2A}$, etc. The following branches B and C comprise ten steps, each represented by resistors $R_{1B}$, $R_{2B}$, $R_{1C}$, etc., for supplying units, tens, hundreds, thousands, etc. All the resistors in the branches A, B and C are identical in value, and the overall accuracy of the system is the random distribution of the resistor tolerances.

The branch A is connected across the source of reference voltage, while the entire branch B is connected by means of movable taps 49 across one segment of branch A, and the entire branch C is connected by means of movable taps 50 across one segment of branch B. The reference output is taken from the movable tap 51 of the branch C and is applied to the input circuit of the reference portion of the servo system. In Fig. 1 the source of reference voltage would comprise the batteries 7 and 8, and the output from tap 51 would be applied to the base 30 of transistor 24.

Let us assume, for example, that there is a reference potential of 100 volts and there are 100 identical resistors $R_{1A}$, etc., in the first branch A. In the positions illustrated, the voltage appearing between the taps 49 and across branch B will range from 96-97 volts above ground potential. The voltage appearing between the taps 50 and across the branch C will range from 96.4-96.5 volts above ground potential. It is seen that the output reference voltage at the tap 51 will be 96.49 volts.

The operation of the network is independent of the applied voltage and requires only that the dissipation rating of the resistor be adequate for the power in the first branch. It is to be understood that any required reference voltage may be applied across branch A, and the voltage at tap 51 will be proportional to the tap settings in decade relation.

From the foregoing description it will be apparent that various other modifications may be made in our invention, and we desire, therefore, that our invention shall not be limited, except as required by the prior art and defined in the appended claims.

What we claim is:

1. A shaft positioning system comprising: a reversible electric motor coupled to said shaft; a direct current source; a first and second energization circuit for said reversible electric motor, each of said circuits including an electronic valve and said source; said electronic valve in said first energization circuit comprising a PNP-type transistor and said electronic valve in said second energization circuit comprising an NPN-type transistor, each of said transistors having base, emitter and collector electrodes.

2. The invention as defined in claim 1, and means for simultaneously controlling the conductivity of said valves.

3. An electronic valve system for reversibly energizing a direct current load comprising: a PNP-type transistor and an NPN-type transistor, each having emitter, collector and base electrodes; means connecting said direct current load in a first circuit in series with the emitter and collector of said PNP-type transistor and a direct current source, and in a second circuit in series with the emitter and collector of said NPN-type transistor and a direct current source; and control means coupled to both of said bases for simultaneously controlling the conductivity of both of said transistors.

4. The invention as defined in claim 3 wherein said last-named means comprises a reference network and an error network differentially connected across a direct current source, and wherein the differential output from said networks is applied to the bases of said transistors.

5. An anti-hunting circuit having a reversible electric motor for positioning a shaft comprising: a source of direct current; a PNP-type transistor and an NPN-type transistor each having a base, an emitter and a collector electrode, said emitters being interconnected and said bases being interconnected, the collectors being connected, respectively, to opposite ends of said direct current source, said reversible electric motor being connected between the junction of said emitters and the center point of said direct current source; and means responsive to a condition for simultaneously controlling the base-emitter bias of said transistors.

6. The invention as defined in claim 5 wherein said last-named means includes a reference network and an error network differentially connected across said direct current source, the differential output from said networks being applied simultaneously to the bases of said transistors.

7. A servo positioner system for remotely positioning a reversible shaft comprising: a reversible electric motor coupled to said shaft; means responsive to a condition for selectively energizing said motor in a forward or reverse direction comprising a reference network and an error network; a reference potentiometer in said reference network and an error potentiometer in said error network, said error potentiometer being mechanically coupled to said motor, and both of said potentiometers being connected across a direct current source; a reference amplifier in said reference network and an error amplifier in said error network; the input circuit to said reference amplifier being connected between said reference potentiometer and a point of reference potential, the input circuit of said error amplifier being connected between said error potentiometer and said point of reference potential; an anti-hunting control circuit for said motor responsive to the change in output of said reference amplifier, said anti-hunting control circuit comprising a PNP-type transistor having base, emitter and collector electrodes and an NPN-type transistor having base, emitter and collector electrodes, said emitters being interconnected and said bases being interconnected, said collectors being connected, respectively, to opposite ends of said direct current source; said motor being connected between the junction of said emitters and the center point of said direct current source; whereby said motor drives said error potentiometer to change the input voltage to said error amplifier to rebalance the error and reference amplifiers and de-energize said motor.

8. The invention as defined in claim 7 wherein said reference and error amplifiers each comprises an input transistor and an output transistor, each having base, emitter and collector electrodes; the base electrode of said input transistor of said reference amplifier being connected to said reference potentiometer, and the base electrode of the input transistor of said error amplifier being connected to said error potentiometer; the emitters of said input transistors being connected through a common resistor to said source to provide forward bias for the base-emitter diode, and the emitters of said output transistors being connected through a common resistor to said source to provide forward bias for the base-emitter diode.

9. The invention as defined in claim 8, wherein said change in output of said reference amplifier is derived from the collector of said output transistor of said first amplifier and is applied simultaneously to the bases of said first and second transistors.

10. A shaft positioning system comprising: a reversible electric motor coupled to said shaft; a source of direct current; a first electronic valve for connecting said source in series with said motor for energization in one direction; a second electronic valve for connecting said source in series with said motor for energization in the opposite direction; said first and second electronic valves comprising, respectively, an NPN and a PNP-type transistor each having base, emitter and collector electrodes, the emitters of said transistors being interconnected and the emitter-collector diode of each of said transistors being connected in series with said motor and said source; means for establishing a reference potential at the bases of said transistors whereby both of said transistors are rendered non-conductive, and whereby a change in said reference potential will render one of said transistors conductive to energize said motor; and means responsive to the energization of said motor to re-establish said reference potential.

11. The invention as defined in claim 10 wherein said means for establishing a reference potential comprises a reference potentiometer; a reference amplifier having an input coupled to said reference potentiometer; an error potentiometer; an error amplifier having an input coupled to said error potentiometer; said amplifiers and said potentiometers being connected across said source, and the output of said reference amplifier establishing said reference potential.

12. The invention as defined in claim 11, wherein said reference amplifier and said error amplifier each comprise at least a first transistor, each having a base, an emitter and a collector, a common emitter-resistor connected in series with both said emitters, and separate loads connected in circuit with said collectors.

13. The invention as defined in claim 11, wherein means are provided for amplifying said reference potential and for matching the impedance of said reference amplifier to the base-emitter diodes of said first and second electronic valves.

14. The invention as defined in claim 11, wherein said reference potentiometer comprises: a decade network having $n$ number of branches, where $n$ equals any whole number, the first branch being connected across said source of direct current and comprising $m$ number of series-connected resistors, where $m$ equals any whole number, the remaining branches each comprising 10 series-connected resistors; means for impressing on each following branch the voltage appearing across any selected resistor in a preceding branch; and means for coupling a selected one of the resistors in the $n$th branch to the input of said reference amplifier.

References Cited in the file of this patent

Burke, H. E.: A Survey of Analog to Digital Converters, Proceeding of IRE, October 1953, pages 1455–1468, page 1460, Figure 10.